United States Patent [19]

Kishida et al.

[11] Patent Number: 4,757,109

[45] Date of Patent: Jul. 12, 1988

[54] PROCESS FOR THE PREPARATION OF MALEIMIDE COPOLYMERS AND THERMOPLASTIC RESIN COMPOSITION USING THE SAME

[75] Inventors: Kazuo Kishida, Ohnocho; Yutaka Toyooka; Atsushi Kimura, both of Ohtake, all of Japan

[73] Assignee: Mitsubishi Rayon Co., Ltd., Tokyo, Japan

[21] Appl. No.: 928,279

[22] PCT Filed: May 16, 1986

[86] PCT No.: PCT/JP86/00252

§ 371 Date: Oct. 14, 1986

§ 102(e) Date: Oct. 14, 1986

[87] PCT Pub. No.: WO86/06732

PCT Pub. Date: Nov. 20, 1986

[30] Foreign Application Priority Data

May 16, 1985 [JP] Japan .................................. 60-104783
May 17, 1985 [JP] Japan .................................. 60-105239

[51] Int. Cl.$^4$ ...................... C08L 39/04; C08L 51/00
[52] U.S. Cl. ..................................... 524/808; 524/504; 524/548; 525/64; 525/66; 525/67; 525/68; 525/73

[58] Field of Search ............... 526/262; 524/548, 808, 524/504; 525/73

[56] References Cited

U.S. PATENT DOCUMENTS 2,971,939  2/1961  Baer ..................................... 525/285

FOREIGN PATENT DOCUMENTS 52-996     1/1977  Japan .
58-162616  9/1983  Japan .
59-135210  8/1984  Japan .

OTHER PUBLICATIONS

Abstract: 84-228087/37, "Heat Resistant Thermoplastic Resin Production", (J59135210).

*Primary Examiner*—Theodore E. Pertilla
*Attorney, Agent, or Firm*—Oblon, Fisher, Spivak, McClelland & Maier

[57] ABSTRACT

A process for the preparation of maleimide copolymers by emulsion polymerization of 50 to 80% by weight of an aromatic vinyl monomer, 10 to 30% by weight of a vinyl cyanide monomer, and 5 to 40% by weight of a maleimide monomer comprising a three step polymerization process wherein the remaining vinyl cyanide monomer is separately added in the third step of said process.

8 Claims, No Drawings

PROCESS FOR THE PREPARATION OF MALEIMIDE COPOLYMERS AND THERMOPLASTIC RESIN COMPOSITION USING THE SAME

TECHNICAL FIELD

This invention relates to a process for the preparation of maleimide copolymers having excellent thermal resistance, and resistance to thermal decomposition, as well as to a thermoplastic resin composition using the same and having excellent thermal resistance, resistance to thermal decomposition, and impact resistance.

PRIOR ART

In recent years, the demand for improved thermal resistance of materials for automobile parts has grown. In particular for the manufacture of interior trim parts such as meter hoods, meter clusters, instrument panels and console boxes, and of exterior trim parts such as bumpers, outer panels and lamp housings, a material having high thermal resistance, good moldability, and not subject to thermal decomposition and thermal discoloration is in demand.

Conventionally, heat-resistant ABS resins, modified polyphenylene ether (modified PPO) resins, polycarbonate (PC) resins and similar resins have been used for the manufacture of automobile parts requiring thermal resistance.

Heat-resistant ABS resins are prepared by the so-called graft blending of (i) a grafted ABS resin formed by grafting acrylonitrile and styrene and/or α-methylstyrene onto a diene rubber and (ii) a resin formed by the copolymerization of acrylonitrile with styrene and/or α-methylstyrene. In the existing circumstances, however, the resulting heat-resistant ABS resins fail to exhibit satisfactorily high thermal resistance because of the inadequate thermal resistance of the copolymer resin (ii) used. Although highly heat-resistant resins can be obtained by increasing the α-methylstyrene content of this copolymer resin (ii), copolymer resins (ii) having such a high α-methylstyrene content are disadvantageous in that resins having a high degree of polymerization cannot be obtained because of their low polymerization rate and in that they are subject to thermal decomposition during molding because of their structure including α-methylstyrene chains connected to each other.

On the other hand, modified PPO resins and PC resins or their modified products generally have the disadvantage of being expensive and poor in moldability. Accordingly, there is a great need to develop a thermoplastic resin composition that is inexpensive, undergoes almost no thermal decomposition, can be molded easily, and has adequately high thermal resistance.

It is already known that maleimide monomers of the formula

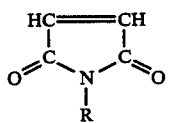

(A)

where R is a hydrogen atom, an alkyl group of 1 to 4 carbon atoms, a cyclohexyl group, an aryl group or a substituted aryl group, can readily copolymerize with vinyl monomers, such as styrene, acrylonitrile or methyl methacrylate to form copolymers which have high thermal resistance but are very brittle.

The polymerization techniques whereby highly heat-resistant resins can be prepared from maleimide monomers include solution polymerization, bulk polymerization, spension polymerization, emulsion polymerization and the like. However, from the viewpoint of uniformity characteristics such as the compositional distribution of each component in the copolymer and the distribution of polymerization degree, emulsion polymerization is considered to be suitable. Moreover, from the viewpoint of moldability, impact resistance and thermal resistance, it is expected that a desirable combination of properties are obtained in copolymers formed by copolymerizing a maleimide monomer with an aromatic vinyl monomer, a vinyl cyanide monomer and the like.

However, if an aromatic vinyl monomer, a vinyl cyanide monomer and a maleimide monomer are subjected to emulsion polymerization with a view to preparing a copolymer having high thermal resistance and resisting thermal decomposition and thermal discoloration, a copolymer having low polymer yield and low thermal resistance and exhibiting poor impact resistance only will be obtained if the total amount of the monomer mixture is simply charged into the polymerization system at one time and the polymerization is then initiated. The reason for this may be that a charge-transfer complex is formed between the maleimide monomer and the aromatic vinyl monomer. Since this charge-transfer complex has high polymerizability, the complex is preferentially polymerized in the earlier stages of the polymerization, so that a copolymer having wide compositional distribution and molecular weight distribution is formed.

Moreover, it has also been found that, when an aromatic vinyl monomer, a vinyl cyanide monomer and a maleimide monomer are polymerized by adding the total amount of a mixture of these monomers continuously to the polymerization system, the polymer yield is low and the resulting copolymer has poor resistance to thermal decomposition and low thermal resistance.

DISCLOSURE OF THE INVENTION

It is an object of the present invention to provide a process for the preparation of maleimide copolymers having excellent thermal resistance and undergoing almost no thermal decomposition or thermal discoloration during molding.

It is another object of the present invention to provide an emulsion polymerization process for the preparation of maleimide copolymers which process can bring about high polymer yield and excellent polymerization stability and can yield copolymers having good resistance to thermal decomposition.

It is still another object of the present invention to provide a thermoplastic resin composition containing a maleimide copolymer and having excellent thermal resistance, resistance to thermal decomposition, and impact resistance.

According to the present invention, there is provided a process for the preparation of maleimide copolymers by emulsion polymerization of 50 to 80% by weight of an aromatic vinyl monomer, 10 to 30% by weight of a vinyl cyanide monomer, and 5 to 40% by weight of a maleimide monomer of the formula

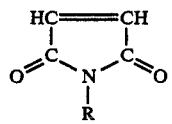

where R is a hydrogen atom, an alkyl group of 1 to 4 carbon atoms, a cyclohexyl group, an aryl group or a substituted aryl group, provided that the total amount of the monomers is 100% by weight, the process being characterized in that the polymerization is carried out by charging not less than 30% by weight of the total amount of the aromatic vinyl monomer and optionally not more than 40% by weight of the total amount of the vinyl cyanide monomer into the polymerization system before initiation of the polymerization; adding, continuously or dividedly, the total amount or the remainder of the vinyl cyanide monomer, the total amount of the maleimide monomer of the formula (A) and the remainder, if any, of the aromatic vinyl monomer to the polymerization system after initiation of the polymerization; maintaining the pH of the aqueous phase of the polymerization system in the range of 3 to 9 at the initiation of the polymerization; and using a redox catalyst containing an oil-soluble organic peroxide.

According to the present invention, there is also provided a resin composition having excellent thermal resistance, resistance to thermal decomposition, and impact resistance, the resin composition being formed by blending a maleimide copolymer (I) prepared by the above-described process with a rubber-reinforced resin (II) obtained by grafting one or more monomers selected from the group consisting of a vinyl cyanide monomer, an aromatic vinyl monomer and an acrylic monomer onto an elastomer having a glass transition temperature of 0° C. or below, in a weight ratio of (I) to (II) ranging from 5/95 to 95/5; and optionally blending 100 parts by weight of the resulting thermoplastic resin composition with 0 to 300 parts by weight of a thermoplastic resin that is hard at room temperature.

BEST MODE FOR CARRYING OUT THE INVENTION

In the present process for the preparation of maleimide copolymers, the aromatic vinyl monomer should be used in an amount of 50 to 80% by weight. If the amount of aromatic vinyl monomer used is less than 50% by weight, the resulting copolymer will have poor processability and fail to exhibit adequate impact strength, while if it is greater than 80% by weight, the proportion of the available maleimide monomer will be reduced and, therefore, a copolymer having low thermal resistance only will be obtained. The vinyl cyanide monomer should be used in an amount of 10 to 30% by weight. If the amount of vinyl cyanide monomer used is less than 10% by weight, the resulting copolymer will have poor processability and fail to exhibit adequate impact strength, while if it is greater than 30% by weight, a copolymer subject to thermal discoloration during processing only will be obtained.

The maleimide monomer of the formula (A) should be used in an amount of 5 to 40% by weight. If the amount of maleimide monomer used is less than 5% by weight, the resulting copolymer will have low thermal resistance, while if it is greater than 40% by weight, a copolymer exhibiting poor impact strength only will be obtained.

It is essential to charge not less than 30% by weight of the total amount of aromatic vinyl monomer used into the polymerization system before initiation of the polymerization. If the amount of aromatic vinyl monomer initially charged is less than 30% by weight, the polymer yield will be low and the resulting copolymer will have low thermal resistance.

The vinyl cyanide monomer may be charged into the polymerization system before initiation of the polymerization. In this case, the amount of vinyl cyanide monomer initially charged should be not more than 40% by weight of the total amount of vinyl cyanide monomer used. If the amount of vinyl cyanide monomer initially charged is greater than 40%, a copolymer of the aromatic vinyl monomer and the vinyl cyanide monomer, which has low thermal resistance, will be formed in the earlier stages of the polymerization to yield only a copolymer having low thermal resistance in the end.

In the process of the present invention, the maleimide monomer of the formula (A) is not charged into the polymerization system before initiation of the polymerication. As stated above, the maleimide monomer forms a charge-transfer complex with the aromatic vinyl monomer. Accordingly, if the maleimide monomer is initially charged into the polymerization system, a copolymer having wide compositional distribution and molecular weight distribution will be formed.

When the polymerization is carried out by charging not less than 30% by weight of the total amount of the aromatic vinyl monomer and optionally not more than 40% by weight of the total amount of the vinyl cyanide monomer into the polymerization system before initiation of the polymerization and then adding, continuously or dividedly, the total amount or the remainder of the vinyl cyanide monomer, the total amount of the maleimide monomer of the formula (A) and the remainder, if any, of the aromatic vinyl monomer into the polymerization system after initiation of the polymerization, the vinyl cyanide monomer, the maleimide monomer and the remainder, if any, of the aromatic vinyl monomer may be added separately. However, it is desirable to add the vinyl cyanide monomer, the maleimide monomer and the remainder of the aromatic vinyl monomer in the form of a mixture. Preferably, the polymerization may be carried out by charging not less than 30% by weight of the total amount of the aromatic vinyl monomer into the polymerization system before initiation of the polymerization; adding a mixture composed of 70 to 95% by weight of the total amount of the vinyl cyanide monomer, the total amount of the maleimide monomer of the formula (A), and the remainder, if any, of the aromatic vinyl monomer into the polymerization system after initiation of the polymerization; and then adding, continuously, dividedly or at one time, the remaining 30 to 5% by weight of the vinyl cyanide monomer into the polymerization system.

Alternatively, the polymerization may preferably be carried out by charging not less than 30% by weight of the total amount of the aromatic vinyl monomer and 5 to 40% by weight of the total amount of the vinyl cyanide monomer into the polymerization system before initiation of the polymerization; adding a mixture composed of 40 to 80% by weight of the total amount of the vinyl cyanide monomer, the total amount of the maleimide monomer of the formula (A), and the remainder, if any, of the aromatic vinyl monomer to the polymerization system after initiation of the polymerization; and then adding the remaining 5 to 25% by weight of the vinyl cyanide monomer to the polymerization system.

Thus, when the polymerization is carried out by adding the vinyl cyanide monomer dividedly, the compositional distribution of the resulting copolymer is made uniform and, as a result, the resin compositions obtained by blending it with a rubber-reinforced resin will show a desired improvement in impact resistance.

In the practice of the present invention, it is essential to maintain the pH of the aqueous phase of the polymerization system in the range of 3 to 9 at the initiation of the polymerication. In an aqueous solution exceeding pH 9, the maleimide monomer is liable to hydrolysis and, as a result, the polymer yield will be lowered and the stability of the polymerization system will be reduced. If the pH is lower than 3, the surface activity of the emulsifier will be reduced and, as a result, the polymer yield will undesirably be lowered.

In the present process for the preparation of maleimide copolymers, the aromatic vinyl monomer may include one or more monomers selected from styrene, α-methylstyrene, tert-butylstyrene, chlorostyrene, vinyltoluene and the like. The vinyl cyanide monomer may include one or more monomers selected from acrylonitrile, methacrylonitrile, fumaronitrile and the like.

The maleimide monomers represented by the above formula (A) include, for example, maleimide, N-methylmaleimide, N-ethylmaleimide, N-propylmaleimide, N-isopropylmaleimide, N-cyclohexylmaleimide, N-phenylmaleimide, N-o-chlorophenylmaleimide, N-toluylmaleimide, N-xylylmaleimide, N-naphthylmaleimide and N-tert-butylmaleimide. Among these maleimide monomers, N-phenylmaleimide, N-methylmaleimide, N-cyclohexylmaleimide and N-o-chlorophenylmaleimide are preferred, and N-phenylmaleimide is especially preferred.

In the present process for the preparation of maleimide copolymers, other vinyl monomers which are copolymerizable with the aforesaid aromatic vinyl monomers, vinyl cyanide monomers and maleimide monomers may be used in an amount of up to 40% by weight of total amount of all monomers. Such other copolymerizable vinyl monomers comprise acrylic monomers including alkyl methacrylates such as methyl methacrylate and butyl methacrylate, and alkyl acrylates such as methyl acrylate and butyl acrylate. These other vinyl monomers can be added at any desired stage of the polymerization.

The emulsifier used in the present invention comprises preferably an anionic emulsifier having emulsifying activity in the pH range of 3 to 9, and examples of such anionic emulsifiers include alkali metal salts of dodecylbenzenesulfonic acid, alkali metal salts of (alkyldiphenyl ether)disulfonic acids, alkali metal salts of alkylnaphthalenesulfonic acids, alkali metal salts of laurylsulfuric acid, sarcosinate and the like. These emulsifiers may be used in combination.

As the polymerization initiator, there is used a redox catalyst containing an oil-soluble organic peroxide. Especially preferred is a catalyst system composed of an oil-soluble organic peroxide, ferrous sulfate, a chelating agent and a reducing agent. If water-soluble initiators such as persulfates are used, the polymerization rate and the productivity will be low and the resulting copolymer will have poor resistance to thermal colorability and resistance to thermal decomposition.

Preferred examples of oil-soluble organic peroxide polymerization initiators include cumene hydroperoxide, diisopropylbenzene hydroperoxide, tert-butyl hydroperoxide and the like. As the reducing agent, there may be used formaldehyde sodium sulfoxylate, glucose, sodium ascorbate and the like. In addition, it is especially desirable to use ferrous sulfate and a chelate compound such as sodium pyrophosphate or sodium ethylenediaminetetraacetate.

If the maleimide copolymer thus obtained is used alone, it may be brittle and exhibit relatively low impact resistance. In order to improve its inadequate impact resistance, it is very effective to blend it with a rubber-reinforced resin formed by grafting a vinyl monomer onto an elastomer. In addition to the rubber-reinforced resin, a thermoplastic resin which is hard at room temperature, such as a polycarbonate (PC) resin or a polybutylene terephthalate (PBT) resin, may optionally be used in combination for the purpose of further improving the impact resistance. Moreover, in order to improve the processability of the maleimide copolymer, it is also effective to use an acrylonitrile-styrene copolymer resin (AS resin) or an acrylonitrile-α-methylstyrene copolymer resin (αSAN resin) in combination therewith.

The elastomer present in the rubber-reinforced resin to be blended with the maleimide copolymer should have a glass transition temperature of 0° C. or below. Specific examples of such elastomers are as follows:

Diene elastomers such as a polybutadiene or a copolymer composed mainly of butadiene and formed by copolymerizing it with at least one monomer selected from acrylonitrile, styrene, methyl methacrylate, and acrylic esters having an alkyl group of 1 to 8 carbon atoms; acrylic elastomers such as a polymer of an acrylic ester having an alkyl group of 1 to 8 carbon atoms or a copolymer composed mainly of such an acrylic ester and formed by copolymerizing it with at least one monomer selected from acrylonitrile, styrene, methyl methacrylate and the like; ethylene-propylene copolymer rubber; ethylene-propylene-nonconjugated diene copolymer rubbers (EPDM rubbers); silicone rubber; and chlorinated polyethylene.

Among diene elastomers, polybutadiene, styrene-butadiene copolymer rubber and acrylonitrile-butadiene copolymer rubber are preferred. Moreover, polybutyl acrylate, acrylonitrile-butyl acrylate copolymers and EPDM rubbers may also be preferably used as the elastomer.

The monomer to be grafted onto the above-defined elastomer preferably comprises at least one monomer selected from vinyl cyanide monomers such as acrylonitrile, methacrylonitrile, fumaronitrile, etc.; aromatic vinyl monomers such as styrene, α-methylstyrene, tert-butylstyrene, vinyltoluene, chlorostyrene, bromostyrene, etc., especially, styrene, α-methylstyrene, tert butylstyrene and vinyltoluene; and acrylic monomers including alkyl methacrylates (such as methyl methacrylate, etc.) , alkyl acrylates (such as methyl acrylate, ethyl acrylate, butyl acrylate, etc.) and the like.

Commercially available examples of rubber-reinforced resins formed by grafting a monomer selected from the above-described group of monomers onto an elastomer as defined above include ABS resins (acrylonitrile butadiene-styrene copolymer resins), MBS resins (methyl methacrylate-butadiene-styrene copolymer resins), AAS resins (acrylonitrile-acrylic rubber-styrene copolymer resins), AES resins (acrylonitrile-EPDM rubber-styrene copolymer resins), ACS resins (acrylonitrile-chlorinated polyethylenestyrene copolymer resins) and the like.

The techniques whereby the monomer can be grafted onto the above-defined elastomer include emulsion polymerization, bulk polymerization, suspension polymerization, solution polymerization, emulsion/suspension polymerization, emulsion/bulk polymerization and the like.

The thermoplastic resins that are hard at room temperature include AS resins, methyl methacrylate resin, methyl methacrylate-styrene copolymer resins, αSAN resins, PC resins, unmodified or modified PPO resins, maleic anhydride-styrene copolymer resins, maleic anhydride-acrylonitrile-styrene copolymer resins, polyester resins such as PBT resin, polyethylene terephthalate (PET) resin, etc., polyamide resins such as 6-nylon, 66 nylon, etc., and the like. Among these resins, AS resins, αSAN resins, PC resins, methyl methacrylate resin, methyl methacrylate-styrene copolymer resins, polyester resins, polyamide resins and PPO resins are preferred. These resins may be used in combination. In order to improve processability, it is effective to use an AS resin or αSAN resin. Moreover, PC resins are effective for the improvement of impact strength. PBT resin, PET resin and polyamide resins are effective for the improvement of chemical resistance and practical thermal resistance.

The proportion (or weight ratio) of the maleimide copolymer (I) to the rubber-reinforced resin (II) may suitably range from 5/95 to 95/5. If the amount of the rubber-reinforced resin is less than 5% by weight, the resulting composition may have unacceptably low impact resistance. On the other hand, if it is greater than 95% by weight, the resulting composition will not show an improvement in thermal resistance.

Where a hard thermoplastic resin is added to the aforesaid blend of the maleimide copolymer (I) and the rubber-reinforced resin (II), the hard thermoplastic resin is suitably used in an amount of 0 to 300 parts by weight per 100 parts by weight of the blend of the maleimide copolymer (I) and the rubber-reinforced resin (II). If the amount of hard thermoplastic resin used is greater than 300 parts by weight, the proportions of the maleimide copolymer and the rubber-reinforced resin will become so low that no improvement in thermal resistance and impact resistance can be expected.

Moreover, hindered phenol antioxidants and phosphite stabilizers may be added to the aforesaid composition for the purpose of improving its thermal stability; benzophenone UV absorbers, hindered amine stabilizers and benzotriazole UV absorbers may be added thereto for the purpose of improving its weather resistance; and amide type lubricants (such as ethylenebis-stearamide, etc.), metallic soaps and the like may be added thereto for the purpose of improving its processability. These additives may be used alone or in combination. By adding a flame retarder or similar additive, the thermoplastic resin composition of the resent invention may also be utilized as a flameretardant resin.

The thermoplastic resin compositions prepared in accordance with the present invention can be utilized in various fields of processing applications such as injection molding, extrusion molding and vacuum forming. Moreover, the articles so formed can be subjected to sheen treatments such as plating, vacuum deposition and sputtering. Furthermore, they can also be coated or painted.

The present invention is more specifically explained with reference to the following examples. In these examples, parts are by weight.

EXAMPLE 1

Preparation of maleimide copolymer I-1:

A 20-liter glass reactor (equipped with a stirrer, a condenser and a thermometer) was thoroughly purged with nitrogen and charged with the following materials (initial charge composition):

| | |
|---|---|
| Purified water | 200 parts |
| Sodium dodecylbenzenesulfonate | 2 parts |
| Sodium sulfate | 0.2 part |
| Disodium ethylenediaminetetraacetate (EDTA-2Na) | 0.01 part |
| Ferrous sulfate heptahydrate ($FeSO_4.7H_2O$) | 0.002 part |
| Rongalite | 0.5 part |

When the composition in the reactor was 10 intimately mixed by stirring, its pH was found to be 8.6. Then, 70 parts of α-methylstyrene was added thereto and intimately mixed therewith, and the resulting mixture was heated to 70° C. Thereafter, the polymerization was initiated by adding the following additive monomers (1) dropwise to the reaction system at 70° C. over a period of 150 minutes:

| Additive monomers (1) | |
|---|---|
| Acrylonitrile | 10 part |
| N—phenylmalimide | 15 part |
| Cumene hydroperoxide (CHP) | 0.5 part |
| tert-Dodecyl mercaptan | 0.1 part |

Following the addition of the additive monomers (1), 5 parts of acrylonitrile was continuously added dropwise as the additive monomer (2). After completion of the addition, the reaction system was heated to 80° C., 0.1 part of CHP was added thereto, and the polymerization was continued at 80° C. for an additional 2 hours. After completion of the polymerization, the pH of the reaction system was 4.0.

The polymer yield of the resulting latex was 94%. This latex was coagulated with 3% magnesium sulfate at a temperature of 90° C. or above, and the resulting coagula were dehydrated, washed with water, and then dried to obtain a white powder.

The white powder thus obtained was mixed with 0.2 part of a phenolic antioxidant (Antage W-400; trade name; manufactured by Kawaguchi Kagaku K.K.) and 0.4 part of a phosphite stabilizer (Mark C; trade name; Adeca-Argus Co.) in a Henschel mixer, and then pelletized by extrusion at 260° C. with a twin-screw extruder (PCM-30; trade name; manufactured by Ikegai Tekko K.K.).

Using a 1-ounce injection molding machine (SAV-30A; trade name; Yamashiro Seiki K.K.), the pellets thus obtained were molded into flat plates having a size of 50×80×3 mm. at 250° C. were used to determine the Vicat softening temperature and the glass transition temperature of the copolymer. Separately, a flat plate molded at 290° C. was used to evaluate the thermal decomposability of the copolymer on the basis of the presence or absence of silver streaks on the surface thereof. The composition of the polymerization system and the results of polymerization are shown in Table 1, and the results of evaluation of various properties of the molded plates are shown in Table 2.

EXAMPLES 2-7 AND COMPARATIVE EXAMPLES 1-2

Polymerization, coagulation, extrusion and evaluation were carried out in the same manner as described in Example 1, except that the initial charge composition, the formulation of the additive monomers (1), and the amount of acrylonitrile used as the additive monomer (2) were modified as shown in Table 1. The results thus obtained are shown in Tables 1 and 2. The maleimide copolymers obtained in Examples 2 and 6 will hereinafter be referred to as maleimide copolymer I-2 and I-3, respectively.

COMPARATIVE EXAMPLE 3 (simultaneous addition of all monomers)

Preparation of maleimide copolymer I-4

A reactor similar to that used in Example 1 was purged with nitrogen and then charged with the following materials (initial charge composition):

| Purified water | 200 parts |
| --- | --- |
| Sodium dodecylbenzenesulfonate | 2 parts |
| sodium sulfate | 0.2 part |
| EDTA-2Na | 0.01 part |
| $FeSO_4.7H_2O$ | 0.002 part |
| Rongalite | 0.5 part |

The composition in the reactor was intimately mixed by stirring and then heated to 70° C. Thereafter, the following materials were added dropwise thereto over a period of 150 minutes:

| Acrylonitrile | 15 parts |
| --- | --- |
| α-methylstyrene | 70 parts |
| N—phenylmaleimide | 15 parts |
| CHP | 0.5 part |
| tert-Dodecyl mercaptan | 0.1 part |

After completion of the addition, the reaction system was heated to 80° C., 0.1 part of CHP was added thereto, and the polymerization was continued for an additional 2 hours. The polymer yield had a relatively low value of 90%.

The resulting latex was coagulated, extruded and evaluated in the same manner as described in Example 1. The results thus obtained are shown in Table 2.

COMPARATIVE EXAMPLE 4 (use of potassium persulfate as initiator)

Preparation of maleimide copolymer I-5

Polymerization was carried out in the same manner as described in Example 1, except that 0.5 part of potassium persulfate was used in place of EDTA-2Na, $FeSO_4.7H_2O$ and Rongalite, and CHP was excluded from the formulation of the additive monomer (1). The polymer yield of the resulting latex had a relatively low value of 85%.

COMPARATIVE EXAMPLE 5 (polymerization at pH 11)

Polymerization was carried out in the same manner as described in Example 1, except that 0.2 part of 10% sodium hydroxide was added to the initial charge composition so as to bring the pH of the polymerization system to 11. The polymer yield of the resulting latex had a relatively low value of 84%.

COMPARATIVE EXAMPLE 6 (polymerization at pH 2)

Polymerization was carried out in the same manner as described in Example 1, except that 0.2 part of 10% hydrochloric acid was added to the initial charge composition so as to bring the pH of the polymerization system to 2.0. The polymer yield of the resulting latex had a relatively low value of 81%.

EXAMPLE 8

Polymerization was carried out in the same manner as described in Example 1, except that the CHP included in the formulation of the additive monomer (1) was replaced by tert-butyl hydroperoxide. Thereafter, coagulation, extrusion and evaluation were carried out in the same manner as described in Example 1. The results thus obtained are shown in Tables 1 and 2.

EXAMPLE 9

Preparation of maleimide copolymer I-6

A maleimide copolymer was prepared in the same manner as described in Example 1, except that the acrylonitrile constituting the additive monomer (2) was used in admixture with the additive monomers (1).

EXAMPLE 10

Preparation of maleimide copolymer I-7

A 20-liter glass reactor (equipped with a stirrer, a condenser and a thermometer) was thoroughly purged with nitrogen and charged with the following materials (the initial charge composition):

| Purified water | 200 parts |
| --- | --- |
| Sodium dodecylbenzenesulfonate | 2 parts |
| Sodium sulfate | 0.2 part |
| EDTA-2Na | 0.01 part |
| $FeSO_4.7H_2O$ | 0.002 part |
| Rongalite | 0.5 part |

When the composition in the reactor was intimately mixed by stirring, its pH was found to be 8.6. Then, 30 parts of α-methylstyrene and 5 parts of acrylonitrile were added thereto and the resulting mixture was emulsified by stirring for 30 minutes. The resulting emulsion was heated to 60° C., and the polymerization was initiated by adding 0.05 part of CHP. At the same time, the following materials were continuously added dropwise to the reaction system over a period of 150 minutes:

| Acrylonitrile | 14 parts |
| --- | --- |
| α-Methylstyrene | 35 parts |
| N—phenylmaleimide | 13 parts |
| CHP | 0.5 part |

Subsequently, 3 parts of acrylonitrile was added dropwise over a period of 10 minutes. Thereafter, the reaction system was maintained at 60° C. for 2 hours to complete the polymerization. After completion of the polymerization, the pH of the reaction system was 4.2. The polymer yield of the resulting latex was 98%. This latex was coagulated with a 10% solution of magnesium sulfate at a temperature of 98° C., and the resulting coagula were dehydrated, washed with water, and then dried to obtain a white powder.

The maleimide copolymers (Examples 1-10) prepared in accordance with the present invention had a high polymer yield and a small amount of coagula produced during the polymerization, thus showing good results. In contrast, when the polymerization was carried out by adding all monomers continuously (Comparative Example 3), the polymer yield was relatively low and large amounts of coagula were produced during the polymerization, so that this process was found to be unsuitable for purposes of industrial production. Similarly, when potassium persulfate was used as polymerization initiator (Comparative Example 4), the polymer yield was low and relatively large amounts of coagula were produced.

Moreover, it is evident from Table 2 that the maleimide copolymers prepared in accordance with the present invention had high thermal resistance and were not subject to thermal decomposition.

SYNTHESIS EXAMPLE 1

Preparation of graft polymer II-1

A reactor was charged with the following materials:

| | |
|---|---|
| Polybutadiene latex (having an average particle diameter of 0.3 μm, a gel content of 80% and a degree of gel swelling of 25) | 60 parts (on a solid basis) |
| Purified water | 140 parts |
| Dextrose | 0.6 part |
| Sodium pyrophosphate | 0.3 part |
| $FeSO_4.7H_2O$ | 0.002 part |
| Potassium rosinate | 1.0 part |

After the composition in the reactor was heated to 60° C., a mixture composed of 12 parts of acrylonitrile, 28 parts of styrene, 0.2 part of CHP and 0.5 part of tert-dodecyl mercaptan was continuously added dropwise to the reaction system over a period of 120 minutes. After completion of the addition, the reaction system was aged at 60° C. for an additional 120 minutes to complete the polymerization. To the resulting latex was added 0.5 part of 2,6-di-tert-butyl-p-cresol (BHT). After intimate mixing, the latex was coagulated with diluted sulfuric acid, dehydrated and then dried to obtain a white powder.

SYNTHESIS EXAMPLE 2

Preparation of graft polymer II-2

A reactor was charged with the following materials:

| | |
|---|---|
| Polybutadiene latex (having an average particle diameter of 0.3 μm, a gel content of 80% and a degree of gel swelling of 25) | 45 parts (on a solid basis) |
| Purified water | 140 parts |
| Dextrose | 0.6 part |
| Sodium pyrophosphate | 0.3 part |
| $FeSO_4.7H_2O$ | 0.002 part |
| Potassium rosinate | 1.0 part |
| Acrylonitrile | 8.4 parts |
| Styrene | 19.6 parts |

After the composition in the reactor was heated to 60° C., the polymerization was initiated by adding 0.3 part of CHP. After the polymerization was continued for 70 minutes, the second-stage polymerization was carried out by adding a mixture composed of 8.1 parts of acrylonitrile, 18.9 parts of α-methylstyrene and 0.2 part of CHP over a period of 1 hour. To the resulting graft polymer latex was added 0.4 part of BHT. Thereafter, the latex was coagulated with diluted sulfuric acid, dehydrated and then dried to obtain a white powder.

SYNTHESIS EXAMPLE 3

Preparation of graft polymer II-3

A reactor was charged with the following materials.

| | |
|---|---|
| Polybutadiene latex (having an average particle diameter of 0.3 μm, a gel content of 80% and a degree of gel swelling of 25) | 60 parts (on a solid basis) |
| Purified water | 140 parts |
| Potassium oleate | 2 parts |
| $FeSO_4.7H_2O$ | 0.003 part |
| Sodium pyrophosphate | 0.3 part |
| Dextrose | 1.0 part |

The composition in the reactor was heated to 60° C. with stirring. While it was kept at 60° C., the polymerization was carried out by adding a mixture composed of 16 parts of styrene, 24 parts of methyl methacrylate, 0.2 part of CHP and 0.3 part of tertdodecyl mercaptan continuously thereto, with stirring, over a period of 3 hours. Then, the reaction system was heated to 70° C. and the polymerization was continued for an additional one hour to obtain a graft polymer latex. To the resulting graft polymer latex was added 0.5 part of BHT. Thereafter, the latex was coagulated with sulfuric acid, dehydrated and then dried to obtain a white powder.

As other rubber-reinforced resins to be blended with a maleimide copolymer, the following resins were used in pellet form:

AAS resin (II-4): Dialac A#700 (trade name: manufactured by Mitsubishi Rayon Co., Ltd.).

AAS resin (II-5): Vitax V6101 (trade name; manufactured by Hitachi Chemical Co., Ltd.).

AES resin (II-6): JSR AES #100 (trade name; manufactured by Japan Synthetic Rubber Co., Ltd.).

EXAMPLES 11-27 AND COMPARATIVE EXAMPLES 7-15

Maleimide copolymers I-1 to I-7, rubber-reinforced resins (graft polymers) II-1 to II-6, and the hard thermoplastic resins given below were mixed in each of the proportions shown in Tables 3 and 4. Moreover, 0.2 part of a phenolic antioxidant (Antage W-400; trade name; manufactured by Kawaguchi Kagaku K. K.) and 0.4 part of a phosphite stabilizer (Mark C; trade name; manufactured by Adeca-Argus Co.) were added as stabilizers. After intimate mixing, each of the resulting blends was extruded at 260° C. with a 30 mmφ twin-screw extruder to obtain a thermoplastic resin composition in pellet form.

AS resin (acrylonitrile-styrene copolymer resin):

According to the suspension polymerization technique, 30 parts of acrylonitrile and 70 parts of styrene were polymerized in the usual manner to form an AS resin. The resulting resin had an acrylonitrile content of 27% by weight and a specific viscosity ($\eta_{sp}/C$) of 0.6.

αSAN resin (acrylonitrile-α-methylstyrene copolymer resin):

According to the emulsion polymerization technique, an αSAN resin having an acrylonitrile content of 20% by weight and a specific viscosity ($\eta_{sp}/C$) of 0.5 was prepared in the usual manner.

PC resin:

Novalex 7022PJ (trade name; manufactured by Mitsubishi Chemical Industries, Ltd.) was used in pellet form.

Using each of the thermoplastic resin compositions thus obtained in pellet form, flat plates having a size of 50×80×3 mm were injection molded at 290° C. in the same manner as described in Example 1, and the thermal decomposability of the resin composition was evaluated by examining the number of silver streaks developed on the surface of a molded plate. Other properties were evaluated according to the following procedures:

Izod impact strength: ASTM D-256 (in kg·cm/cm), notched ¼" bar.

Melt flow index: ASTM D-1238 (in g/10 min.), 230° C.×5 kg load.

Rockwell hardness: ASTM D-785 (in R scale).

Vicat softening temperature: ISO R-306 (in ° C.), 5 kg load.

As shown in Examples 11-13 and 27, the blends of graft polymer II-1 (grafted ABS resin) and maleimide copolymers were markedly improved in thermal resistance (Vicat softening temperature) compared with the blend with AS resin (Comparative Example 11) and the blend with αSAN resin (Comparative Example 12).

In Examples 14 and 15, graft polymer II-2 containing α-methylstyrene as a graft monomer was used. The use of this graft polymer was found to bring about a substantial improvement in impact strength compared with the use of graft polymer II-1 (Examples 11-13). Moreover, these blends were much superior in impact strength to the blend with αSAN resin (Comparative Example 15).

In Example 16, graft polymer II-3 (grafted MBS resin) was used and the results of evaluation were substantially the same as those obtained with the grafted ABS resin. This indicates that grafted MBS resins are also effective in improving the impact strength of maleimide copolymers.

Moreover, as is evident from Examples 17-19, the use of weather-resistant resins (such as AAS resins and AES resins) as rubber-reinforced resins is effective in the improvement of thermal resistance.

Furthermore, as is evident from Examples 20 and 21, the incorporation of an AS resin into blends of a grafted ABS resin and a maleimide copolymer is effective in the improvement of melt flow index which is a measure of processability.

It can be seen from Examples 22 and 23 that, when an αSAN resin is incorporated into blends of a grafted ABS resin and a maleimide copolymer, the resulting resin composition shows a slight improvement in processability while suffering little loss in thermal resistance.

In addition, it is evident from Examples 24-26 that a resin composition having very high impact strength and excellent thermal resistance can be obtained by incorporating a PC resin thereinto.

TABLE 1

| | | Examples | | | | | | | | | | Comparative Examples | | | | | |
|---|---|---|---|---|---|---|---|---|---|---|---|---|---|---|---|---|---|
| Example No. | | 1 | 2 | 3 | 4 | 5 | 6 | 7 | 8 | 9 | 10 | 1 | 2 | 3 | 4 | 5 | 6 |
| Initial charge composition[1] | α-Methylstyrene | 70 | 70 | 60 | — | — | 30 | 40 | 30 | 70 | 30 | 15 | 85 | — | 70 | 70 | 70 |
| | Styrene | — | — | — | 27 | 20 | — | — | — | — | — | — | — | — | — | — | — |
| | N—phenyl-maleimide | — | — | — | — | — | — | — | — | — | — | — | — | — | — | — | — |
| | Acrylonitrile | — | — | — | — | — | — | — | — | 5 | — | — | — | — | — | — | — |
| | Sodium dodecyl-benzenesulfonate | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| | Purified water | 200 | 200 | 200 | 200 | 200 | 200 | 200 | 200 | 200 | 200 | 200 | 200 | 200 | 200 | 200 | 200 |
| | Potassium persulfate | — | — | — | — | — | — | — | — | — | — | — | — | — | 0.5 | — | — |
| | 10% NaOH | — | — | — | — | — | — | — | — | — | — | — | — | — | — | 0.2 | — |
| | 10% HCl | — | — | — | — | — | — | — | — | — | — | — | — | — | — | — | 0.2 |
| | pH of aqueous phase | 8.6 | 8.6 | 8.6 | 8.1 | 8.7 | 8.7 | 8.7 | 8.7 | 8.6 | 8.5 | 8.6 | 8.6 | 8.6 | 6.0 | 11 | 2.0 |
| Additive monomer (1) | Acrylonitrile | 10 | 15 | 15 | 14 | 15 | 14 | 14 | 14 | 15 | 14 | 10 | 6 | 15 | 10 | 10 | 10 |
| | N—phenyl-maleimide | 15 | 10 | 20 | 23 | 30 | 13 | 13 | 13 | 15 | 13 | 15 | 6 | 15 | 15 | 15 | 15 |
| | α-Methylstyrene | — | — | — | 33 | Styrene 30 | 40 | 30 | 40 | — | 35 | 55 | — | 70 | — | — | — |
| | CHP | 0.5 | 0.5 | 0.5 | 0.5 | 0.5 | 0.5 | 0.5 | — | 0.5 | 0.5 | 0.5 | 0.5 | 0.5 | — | 0.5 | 0.5 |
| | tert-Butyl hydroperoxide | — | — | — | — | — | — | — | 0.7 | — | — | — | — | — | — | — | — |
| Additive monomers (a) | Acrylonitrile | 5 | 5 | 5 | 3 | 5 | 3 | 3 | 3 | — | 3 | 5 | 3 | — | 5 | 5 | 5 |
| | CHP | 0.1 | 0.1 | 0.1 | 0.1 | 0.1 | 0.1 | 0.1 | 0.1 | — | 0.1 | 0.1 | 0.1 | 0.1 | — | 0.1 | 0.1 |
| Results of polymerization | Polymer yield[2] | 94 | 98.5 | 99 | 95 | 93 | 94.5 | 94.5 | 93 | 94 | 98 | 91 | 80 | 89 | 85 | 84 | 81 |
| | $\eta_{sp}C$[3] | 0.51 | 0.58 | 0.61 | 0.63 | 0.50 | 0.49 | 0.49 | 0.51 | 0.49 | 0.58 | 0.47 | 0.49 | 0.45 | 0.55 | 0.45 | 0.44 |
| | Percentage of coagula[4] | 0.4 | 0.1 | 0.2 | 0.2 | 0.4 | 0.6 | 0.5 | 0.5 | 0.4 | 0.3 | 0.9 | 0.9 | 1.5 | 2.5 | 3.0 | 3.5 |

[1]0.2 part of sodium sulfate, 0.01 part of EDTA-2Na, 0.002 part of FeSO$_4$.7H$_2$O, and 0.5 part of Rongalite were used as components common to all examples and comparative examples.
[2]The latex was coagulated with isopropyl alcohol, and the resulting coagula were filtered off, vacuum-dried and weighed to determine the yield of the polymer.
[3]0.1 g of the polymer obtained in (2) was dissolved in 50 ml of dimethylformamide and the specific viscosity of the resulting solution was measured at 25° C. with a Ubbellohde viscometer.
[4]The latex was filtered through a 100-mesh wire gauze to determine the amount (in % by weight) of coagula present therein.

TABLE 2

| Example No. | Examples | | | | | | | | | | Comparative Example | | | | | |
|---|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 | 6 |
| Maleimide copolymer | I-1 | I-2 | | | | I-3 | | | I-6 | I-7 | | | I-4 | I-5 | | |
| Glass transition temperature (°C.)[1] | 175 | 160 | 175 | 160 | 162 | 172 | 171 | 170 | 170 | 171 | 171 | 145 | 165 | 160 | 161 | 159 |
| Vicat softening temperature (°C.) | 155 | 140 | 157 | 142 | 144 | 151 | 153 | 150 | 151 | 150 | 149 | 125 | 145 | 141 | 143 | 141 |
| Melt flow index[2] | 0.75 | 0.95 | 0.54 | 1.50 | 1.53 | 0.83 | 0.84 | 0.86 | 0.85 | 0.90 | 0.89 | 0.95 | 0.9 | 0.92 | 1.1 | 1.2 |
| Thermal decomposability at 290° C.[3] | O | O | O | O | O | O | O | O | Δ | O | Δ | XX | Δ | X | X | X |

[1] Glass transition temperature was determined from the peak temperature of E" (the imaginary part of the complex number of Young's modulus) recorded with Rheovibron DDV-IIIC (trade name; manufactured by Toyo-Baldwin Co.).
[2] Using a melt indexer, melt flow index was measured at 230° C. under a load of 5 kg according to ASTM D-1238.
[3] On the basis of the number of silver streaks developed on the surface of a molded plate (50 × 80 × 3 mm), thermal decomposability was evaluated according to the following criteria.
O: No silver streak is observed.
Δ: 1 to 10 silver streaks are observed.
X: More than 10 silver streaks are observed.
XX: A very large number of silver streaks are observed.

TABLE 3

| | | Example No. | | | | | | | | |
|---|---|---|---|---|---|---|---|---|---|---|
| | | 11 | 12 | 13 | 14 | 15 | 16 | 17 | 18 | 19 |
| Rubber-reinforced resin | Graft polymer II-1 | 34 | 34 | 34 | | | | | | |
| | Graft polymer II-2 | | | | 45 | 45 | | | | |
| | Graft polymer II-3 | | | | | | 34 | | | |
| | AAS resin II-4 | | | | | | | 50 | | |
| | AAS resin II-5 | | | | | | | | 50 | |
| | AES resin II-6 | | | | | | | | | 50 |
| Maleimide copolymer | Maleimide copolymer I-1 | 66 | | | 55 | | 66 | | | |
| | Maleimide copolymer I-2 | | | | | | | | | |
| | Maleimide copolymer I-3 | | | 66 | | 55 | | 50 | 50 | 50 |
| | Maleimide copolymer I-4 | | | | | | | | | |
| | Maleimide copolymer I-5 | | | | | | | | | |
| | Maleimide copolymer I-6 | | 66 | | | | | | | |
| | Maleimide copolymer I-7 | | | | | | | | | |
| Hard thermoplastic resin | AS resin | | | | | | | | | |
| | αSAN resin | | | | | | | | | |
| | Polycarbonate resin | | | | | | | | | |
| Results of evaluation | Izod impact strength | 10 | 9 | 12 | 20 | 25 | 11 | 6.8 | 4.5 | 6.5 |
| | Melt flow index | 0.4 | 0.4 | 0.5 | 0.3 | 0.4 | 0.2 | 3.3 | 2.9 | 3.5 |
| | Rockwell hardness | 107 | 107 | 107 | 105 | 105 | 109 | 107 | 106 | 110 |
| | Vicat softening temperature | 140 | 139 | 135 | 129 | 125 | 135 | 121 | 120 | 120 |
| | Thermal decomposability (290° C.) | O | Δ | O | O | O | O | O | O | O |

| | | Example No. | | | | | | | |
|---|---|---|---|---|---|---|---|---|---|
| | | 20 | 21 | 22 | 23 | 24 | 25 | 26 | 27 |
| Rubber-reinforced resin | Graft polymer II-1 | 34 | | 34 | | 25 | 25 | 25 | 34 |
| | Graft polymer II-2 | | 45 | | 45 | | | | |
| | Graft polymer II-3 | | | | | | | | |
| | AAS resin II-4 | | | | | | | | |
| | AAS resin II-5 | | | | | | | | |
| | AES resin II-6 | | | | | | | | |
| Maleimide copolymer | Maleimide copolymer I-1 | | | | | | | | |
| | Maleimide copolymer I-2 | | | | | | | | |
| | Maleimide copolymer I-3 | 50 | 40 | 33 | 28 | 55 | 35 | 15 | |
| | Maleimide copolymer I-4 | | | | | | | | |
| | Maleimide copolymer I-5 | | | | | | | | |
| | Maleimide copolymer I-6 | | | | | | | | |
| | Maleimide copolymer I-7 | | | | | | | | 66 |
| Hard thermoplastic resin | AS resin | | | 15 | | | | | |
| | αSAN resin | 16 | | | 33 | 27 | | | |
| | Polycarbonate resin | | | | | 20 | 40 | 60 | |
| Results of evaluation | Izod impact strength | 11 | 22 | 10 | 2 | 10 | 40 | 51 | 14 |
| | Melt flow index | 0.94 | 1.1 | 0.8 | 0.6 | 0.8 | 1.3 | 1.5 | 0.5 |
| | Rockwell hardness | 107 | 105 | 106 | 109 | 111 | 109 | 107 | 107 |
| | Vicat softening temperature | 122 | 119 | 128 | 125 | 141 | 139 | 137 | 136 |
| | Thermal decomposability (290° C.) | O | O | O | O | O | O | O | O |

TABLE 4

|  |  | Comparative Example No. | | | | | | | | |
|---|---|---|---|---|---|---|---|---|---|---|
|  |  | 7 | 8 | 9 | 10 | 11 | 12 | 13 | 14 | 15 |
| Rubber-reinforced resin | Graft polymer II-1 | 34 | 34 |  | 34 | 34 | 34 | 25 | 25 |  |
|  | Graft polymer II-2 |  |  | 45 |  |  |  |  |  | 45 |
|  | Graft polymer II-3 |  |  |  |  |  |  |  |  |  |
|  | AAS resin II-4 |  |  |  |  |  |  |  |  |  |
|  | AAS resin II-5 |  |  |  |  |  |  |  |  |  |
|  | AES resin II-6 |  |  |  |  |  |  |  |  |  |
| Maleimide copolymer | Maleimide copolymer I-1 |  |  |  |  |  |  |  |  |  |
|  | Maleimide copolymer I-2 |  |  |  |  |  |  |  |  |  |
|  | Maleimide copolymer I-3 |  |  |  |  |  |  |  |  |  |
|  | Maleimide copolymer I-4 | 66 |  | 40 |  |  |  |  |  |  |
|  | Maleimide copolymer I-5 |  | 66 |  | 33 |  |  | 35 |  |  |
|  | Maleimide copolymer I-6 |  |  |  |  |  |  |  |  |  |
|  | Maleimide copolymer I-7 |  |  |  |  |  |  |  |  |  |
| Hard thermoplastic resin | AS resin |  |  | 15 |  | 66 |  |  | 35 | 35 |
|  | αSAN resin |  |  |  | 33 |  | 66 |  |  |  |
|  | Polycarbonate resin |  |  |  |  |  |  | 40 | 40 |  |
| Results of evaluation | Izod impact strength | 8 | 10 | 15 | 10 | 39 | 14 | 21 | 29 | 16 |
|  | Melt flow index | 0.5 | 0.3 | 1.2 | 0.7 | 1.0 | 1.5 | 1.2 | 1.5 | 1.7 |
|  | Rockwell hardness | 108 | 107 | 105 | 107 | 100 | 102 | 108 | 107 | 101 |
|  | Vicat softening temperature | 135 | 140 | 115 | 130 | 92 | 118 | 129 | 131 | 112 |
|  | Thermal decomposability (290° C.) | X | XX | X | X | O | O | X | X | O |

We claim:

1. A process for the preparation of maleimide copolymers by emulsion polymerization of 50 to 80% by weight of an aromatic vinyl monomer, 10 to 30% by weight of a vinyl cyanide monomer, and 5 to 40% by weight of a maleimide monomer of the formula

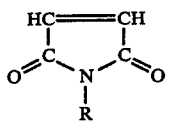

where R is a hydrogen atom, an alkyl group of 1 to 4 carbon atoms, a cyclohexyl group, an aryl group or a substituted aryl group, provided that the total amount of said monomers is 100% by weight, said process comprising charging not less than 30% by weight of the total amount of said aromatic vinyl monomer into the polymerization system before initiation of said polymerization; adding a mixture composed of 70 to 95% by weight of the total amount of said vinyl cyanide monomer, the total amount of said maleimide monomer of the formula (A), and the remainder, if any, of said aromatic vinyl monomer into the polymerization system after initiation of the polymerization; and then adding the remaining 30 to 5% by weight of said vinyl cyanide monomer into the polymerization system; maintaining the pH of the aqueous phase of the polymerization system in the range of 3 to 9 at the initiation of said polymerization; and using a redox catalyst containing an oil-soluble organic peroxide.

2. A process as claimed in claim 1 wherein said aromatic vinyl monomer comprises at least one monomer selected from the group consisting of styrene, α-methylstyrene, tert-butylstyrene, chlorostyrene and vinyltoluene.

3. A process as claimed in claim 1 wherein said vinyl cyanide monomer comprises at least one monomer selected from the group consisting of acrylonitrile, methacrylonitrile and fumaronitrile.

4. A process as claimed in claim 1 wherein said maleimide monomer of the formula (A) comprises at least one monomer selected from the group consisting of N-phenylmaleimide, N-methylmaleimide, N-cyclohexylmaleimide and N-o-chlorophenylmaleimide.

5. A process for the preparation of maleimide copolymers by emulsion polymerization of 50 to 80% by weight of an aromatic vinyl monomer, 20 to 30% by weight of a vinyl cyanide monomer, and 5 to 40% by weight of a maleimide monomer of the formula

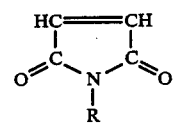

where R is a hydrogen atom, an alkyl group of 1 to 4 carbon atoms, a cyclohexyl group, an aryl group or a substituted aryl group, provided the total amount of said monomers is 100% by weight, said process comprising: charging not less than 30% by weight of the total amount of said aromatic vinyl monomer and 5 to 40% by weight of the total amount of said vinyl cyanide monomer into the polymerization system before initiation of said polymerization; adding a mixture composed of 40 to 80% by weight of the total amount of said vinyl cyanide monomer, the total amount of said maleimide monomer of the formula (A), and the remainder, if any, of said aromatic vinyl monomer to the polymerization system after initiation of said polymerization; and then adding the remaining 5 to 25% by weight of said vinyl cyanide monomer to the polymerization system; maintaining the pH of the aqueous phase of the polymerization system in the range of 3 to 9 at the initiation of said polymerization; and using a redox catalyst containing an oil-soluble organic peroxide.

6. A process as claimed in claim 5 wherein said aromatic vinyl monomer comprises at least one monomer selected from the group consisting of styrene, α-methylstyrene, tert-butylstyrene, chlorostyrene and vinyltoluene.

7. A process as claimed in claim 5 wherein said vinyl cyanide monomer comprises at least one monomer selected from the group consisting of acrylonitrile, methacrylonitrile and fumaronitrile.

8. A process as claimed in claim 5 wherein said maleimide monomer of the formula (A) comprises at least one monomer selected from the group consisting of N-phenylmaleimide, N-methylmaleimide, N-cyclohexylmaleimide and N-o-chlorophenylmaleimide.

* * * * *

UNITED STATES PATENT AND TRADEMARK OFFICE
CERTIFICATE OF CORRECTION

PATENT NO. : 4,757,109
DATED : JULY 12, 1988
INVENTOR(S) : Kazuo KISHIDA et al It is certified that error appears in the above-identified patent and that said Letters Patent is hereby corrected as shown below:

On the cover page, item [75] should read:

-- Inventors: Kazuo Kishida; Yutaka Toyooka; Atsushi Kimura, all of Hiroshima, Japan --.

COL. 18, line 3, claim 5, change "20" to --10--.

Signed and Sealed this

Sixteenth Day of February, 1993

*Attest:*

STEPHEN G. KUNIN

*Attesting Officer*    *Acting Commissioner of Patents and Trademarks*